Apr. 10, 1923. 1,451,662
K. FORBES
FASTENING DEVICE FOR MOTOR VEHICLE HOODS
Filed June 13, 1919
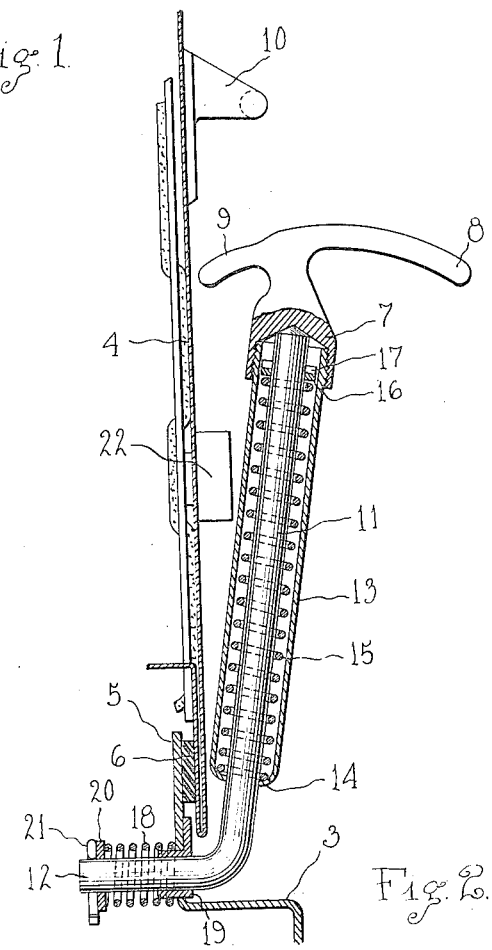
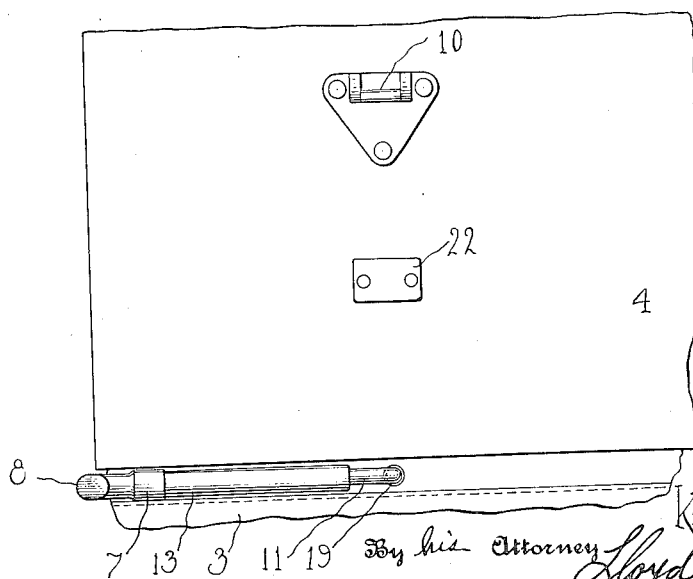
Inventor
Kingston Forbes
By his Attorney
Lloyd Blackmore Patented Apr. 10, 1923.

1,451,662

UNITED STATES PATENT OFFICE.

KINGSTON FORBES, OF FLINT, MICHIGAN, ASSIGNOR TO GENERAL MOTORS CORPORATION, OF DETROIT, MICHIGAN, A CORPORATION OF DELAWARE.

FASTENING DEVICE FOR MOTOR-VEHICLE HOODS.

Application filed June 13, 1919. Serial No. 303,941.

*To all whom it may concern:*

Be it known that I, KINGSTON FORBES, a citizen of the United States, and resident of Flint, Genesee County, State of Michigan, have invented certain new and useful Improvements in Fastening Devices for Motor Vehicle Hoods, of which the following is a specification.

My invention relates to hood fastening devices designed for use with the hoods which enclose the motors of automobiles, motor trucks, and similar self propelled vehicles, to hold the doors of the hood in their closed positions.

The principal object of my invention is to provide an improved fastening device for securing the doors of hoods of automobiles and similar self propelled vehicles in a closed position, said fastening device having features of construction and operation whereby the doors will be held in a closed position and, in addition, will be prevented from rattling; because of the fact that when the doors are in a closed position they are acted upon by springs which exert a constant pressure upon them and hold the free edges of the doors in constant engagement with a stop against which the said free ends abut. The springs in question thus act to prevent looseness between the edges of the doors and the stops against which they are held thereby preventing slamming of the doors and preventing the noise incident to slight movements of the edges of the doors against and away from the stops in question.

A further object of my invention is to provide an improved door fastening device for use with automobile hoods which will be simple in construction and effective for the purpose for which it is designed, and which may be readily manufactured at a minimum expense.

With the above and other objects in view, my invention consists of an improved hood door fastening device for automobiles illustrated in the accompanying drawing and hereinafter described and claimed, and in such variations and modifications thereof as will be obvious to those skilled in the art to which my invention relates; so long as such modified or changed structures come within the scope of the concluding claims wherein the particular features in which my invention consists are pointed out.

Referring to the drawing wherein the preferred embodiment of my invention is illustrated:

Figure 1 is a view showing a section of my invention together with so much of the door of an automobile hood, and other elements associated with the hood, as is necessary to an understanding of my invention, and Figure 2 is a view showing the elements shown in Fig. 1 in side elevation.

Referring to the drawing, the reference numeral 3 designates a suitable support or sill located adjacent the lower end of the door 4 through which access may be had to the engine covered by the hood when the door is opened, and which sill is provided with a portion 5 which forms a fixed stop for the lower free edge of the door; a suitable buffer or strip of noise reducing material 6 being interposed between the stop 5 and the free edge of the door, to thereby prevent direct contact between the edge of the door and the stop and lessen the noise due to impact between the edge of the door and the fixed stop or equivalent member which limits its closing movement.

The reference numeral 7 designates a spring operated latch member having a handle 8 whereby it may be operated, and a hook 9 adapted to engage an element carried by the door, such, for example, as the lug or staple 10; and which latch member is acted upon by a spring which tends to pull the door downwardly when the hook 9 is hooked into engagement with the lug 10 or other element with which the hook engages, to thereby hold the door in a closed position. The spring operated latch member 7 is itself carried by an oscillating member which in turn is supported by the fixed support or sill 3 above referred to, so that the said oscillating member together with the latch member may be swung down and made to occupy a position below the lower edge of the door, as illustrated in Fig. 2, in order that the oscillating supporting and latch members may not interfere with the opening of the door. When swung down into the horizontal position in which the parts are shown in Fig. 2, the latch member rests upon the sill 3; although it will be appreciated that the essential feature of operation, so far as concerns the capability of sidewise and downward movement of the latch member, is that the same may be swung down into a position below the lower edge of the door so as not to interfere with the opening thereof.

The latch member 7 is movable relative to the oscillating member whereby it is supported in order that the hook at the upper end thereof may be engaged with the lug 10 and, in the embodiment of my invention illustrated, the oscillating supporting member is in the form of a rod bent to provide end portions 11, 12 disposed approximately at right angles one to the other; and the latch member is provided with a depending tube 13 into which the upper end portion 11 of the said supporting member extends. The lower end of the tube 13 is turned inwardly so as to bear against the end portion 11 of the supporting member, as shown at 14, and a spring 15 is located within the tube; the ends of which spring abut against the lower inturned end 14 of the tube and against a washer 16 at the upper end of the end portion 11, said washer being retained in place by a pin 17 extending through a hole in the said end portion.

The oscillating supporting member whereby the latch member 7 is supported is itself movable transverse to the fixed support 3, or, as otherwise expressed, is pressed inward or to the left, Figure 1, by means of a suitable spring in order to thereby hold the lower free edge of the door 4 in contact with the strip of cushioning material 6, or against the fixed stop 5 which limits the closing movement of the door.

In the embodiment of my invention illustrated in which the oscillating supporting member is made up of the ends 11, 12 of a rod bent at or substantially at right angle intermediate its ends the sidewise movement of the lower end of the fastening device whereby the free edge of the door is held is produced by a spring 18 surrounding the end 12 of the supporting member, and acting to force the said end to the left along the bearing 19 whereby the said end is supported; said spring acting between the inner surface of the upwardly extending portion 6 and a washer 20 secured in place upon the end 12 by means of a pin 21.

The force exerted by the spring 18 is preferably transmitted to the door through a buffer or abutment 22 carried by the door; and it will be appreciated, referring to Figure 1, that upon lifting the spring operated latch member 7 the hook 9 thereof may be engaged with the lug 10 upon the door, during which operation the spring 15 will be compressed. When the hook is in engagement with the lug the tube 13 of the latch member will contact with the buffer or abutment 22, the proportions and arrangement of the parts being such that the spring 18 will be compressed as the hook 9 is swung into engagement with the lug 10 upon the door.

It therefore follows that when the hook 9 of the latch member is in engagement with the lug 10 the spring 15 will act to pull the door downward, and to hold the latch member in engagement with the lug 10, while the spring 18 will act to force the latch member mechanism as a whole to the left, thus transmitting force to the door through the abutment or buffer 22 and holding the lower end of the door against the stop 5. The spring 18 will therefore act to prevent the banging of the lower edge of the door against the stop which limits its closing movement, and thus prevents noise due to movements of the door against the stop due to vibration of the vehicle.

While in describing my invention I have referred to a specific embodiment thereof which is illustrated in the accompanying drawing, it will be appreciated that the form illustrated is merely for the purpose of explaining the essential features in which my invention consists; and that the particular form or embodiment of my invention illustrated may be modified in various ways without departing from my invention. so long as the forms thus produced are within the scope of the following claims wherein the particular features wherein my invention consists are pointed out.

Having thus described and explained my invention, I claim and desire to secure by Letters Patent:

1. In a hood door fastening device of the class described, a suitable support located adjacent the free edge of the door; an oscillating rod bent intermediate its length to provide end portions disposed approximately at right angles to one another, and one of which end portions extends through and is longitudinally movable along a bearing provided in said support; a spring surrounding said end portion and acting between said support and an abutment carried by said end to thereby move the end of the rod in question longitudinally within said bearing; a spring operated latch member having a tubular portion into which the other end of said rod extends, and a hook adapted to engage an element on the door to thereby hold same in a closed condition; a spring located within said tubular portion and surrounding the last mentioned end of the rod aforesaid, and the ends of which spring act between the free end of said tubular portion and an abutment carried by the last mentioned end of said rod.

2. In a hood door fastening device of the class described, a suitable support located adjacent the free edge of the door; an oscillating supporting member having end portions disposed approximately at right angles to one another, and one of which extends through and is longitudinally movable in a bearing provided in said support; a spring acting upon said end portion to move it longitudinally within said bearing; a latch member having a tube into which the other end of said oscillating supporting member extends, and a hook adapted to engage an element carried by the door to thereby hold the same in a closed condition; and a spring located within said tube and the ends of which are in operative engagement with the end of said tube and with an abutment carried by the last mentioned end portion of said supporting member.

3. In a hood door fastening device of the class described, a suitable support located adjacent the free edge of the door; an oscillating supporting member having end portions disposed approximately at right angles to one another, and one of which extends through and is longitudinally movable in a bearing provided in said support; a spring acting upon said end portion to move it longitudinally within said bearing; a spring operated latch member carried by the other end of said oscillating supporting member and having a hook adapted to engage an element carried by the door to thereby hold the same in a closed condition; and an abutment carried by the door and so located as to be engaged by an element of the fastening device when the door is secured in its closed position.

4. In a device of the class described, a support, a hood door engaging one side of said support, a lug or keeper on said door, a latch mounted on said support and movable laterally thereof and adapted to engage said keeper to hold said hood door in lowered position and means carried by said latch for holding said door laterally against said support.

5. In a hood door fastening device of the class described, a spring operated latch member having a hook adapted to engage an element carried by the door to thereby hold the same in a closed condition; a suitable support located adjacent the free edge of said door; an oscillating member supported by said support and whereby said latch member is carried, and which oscillating member is movable transverse to said support; and a spring acting upon said oscillating member to move the same as aforesaid, to thereby force the free edge of the door against a fixed stop.

6. In a hood door fastening device of the class described, a spring operated latch member having a hook adapted to engage an element carried by the door to thereby hold the same in a closed condition; a suitable support located adjacent the free edge of said door; an oscillating member supported by said support and whereby said latch member is carried, and which oscillating member is movable transverse to said support; a spring acting upon said oscillating member to move the same as aforesaid, to thereby force the free edge of the door against a fixed stop; and an abutment through which the force exerted by said spring is transmitted to said door.

7. In a hood door fastening device of the class described, a spring operated latch member having a hook adapted to engage an element carried by the door to thereby hold the same in a closed condition; a suitable support located adjacent the free edge of said door; an oscillating member supported by said support and whereby said latch member is carried, and which oscillating member is movable transverse to said support; a spring acting upon said oscillating member to move the same as aforesaid to thereby force the free edge of the door against a fixed stop; and an abutment carried by said door and so located as to be engaged by said spring operated latch member.

In testimony whereof I affix my signature.

KINGSTON FORBES.